United States Patent Office 2,790,653
Patented Apr. 30, 1957

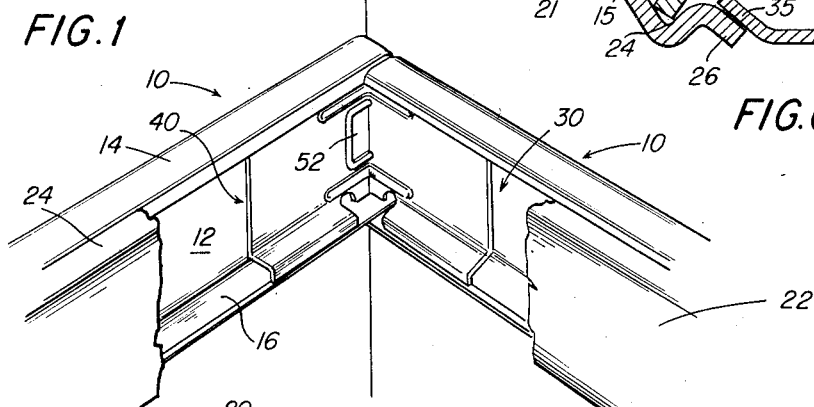
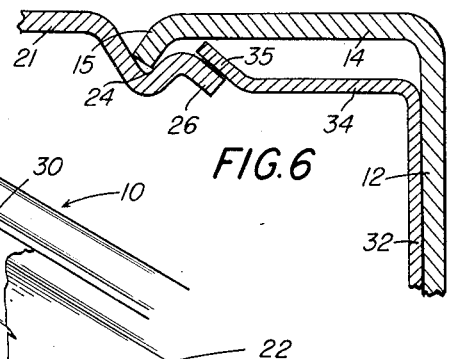
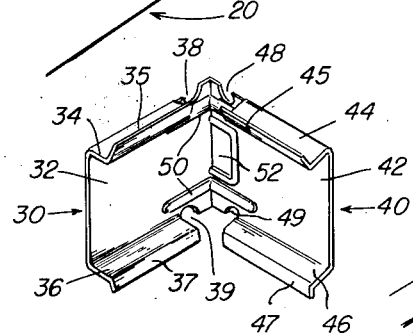
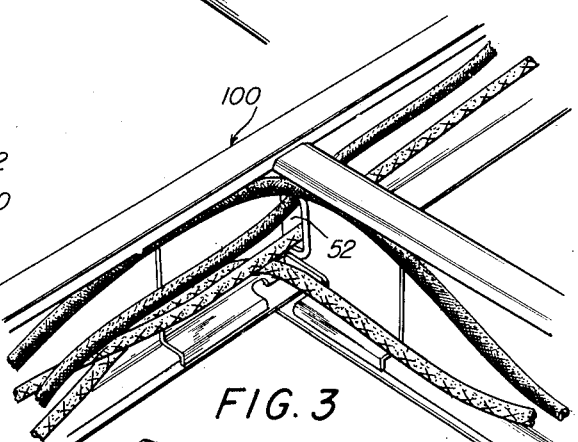
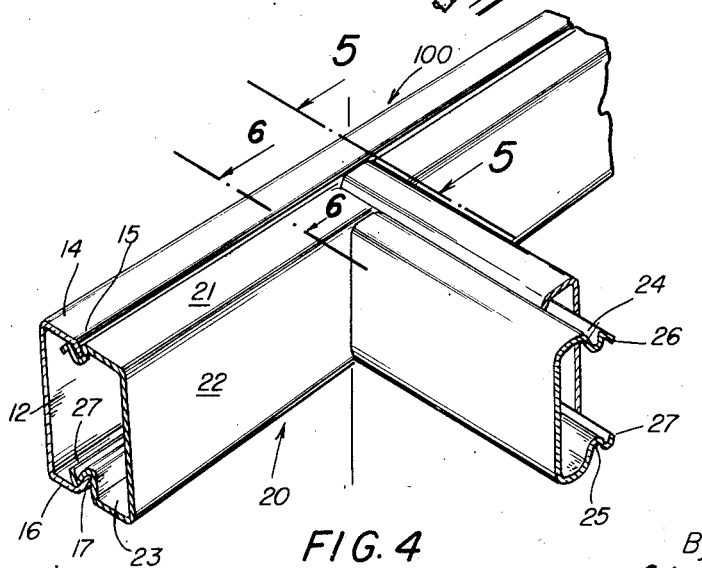
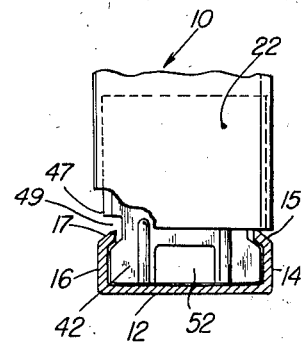
April 30, 1957 — R. H. MURPHY — 2,790,653
ELBOW CONNECTION FOR SURFACE WIRING CONDUITS
Filed July 15, 1954
FIG. 1
FIG. 2
FIG. 3
FIG. 4
FIG. 5
FIG. 6
Inventor
Robert H. Murphy
By his attorneys
Howson and Howson

2,790,653

ELBOW CONNECTION FOR SURFACE WIRING CONDUITS

Robert H. Murphy, West Hartford, Conn., assignor to The Wiremold Company, West Hartford, Conn., a corporation of Connecticut Application July 15, 1954, Serial No. 443,588

13 Claims. (Cl. 285—156)

This invention relates to surface wiring conduits or ducts for electric wiring systems. More particularly, it relates to a connecting elbow and specifically, an inside elbow connection for adjoining ducts where they intersect or come together, such as at different intersecting walls.

It is an object of the invention to provide an improved connecting elbow for connecting adjoining ends of sheet metal ducts or conduits of surface wiring systems, avoiding in many uses the need for a separate corner unit, which elbow can readily be assembled in the ducts to make the connection and may be economically manufactured.

Another object is to provide an elbow of the aforesaid type which can be used both to connect adjoining ducts at corners, such as where walls intersect, and to connect a duct at a point along the length of another duct, forming a T-connection.

Another object is to provide an elbow of the aforesaid type which will permit conduit wires to be continued on through the duct past a T-connection without needlessly weakening the elbow or complicating its construction or requiring special construction of the duct proper.

Another object of the invention is to provide an elbow of the aforesaid type which may be stamped out as one piece from sheet metal.

Other objects and advantages of the invention will become apparent as it is described in connection with the accompanying drawing.

In the drawing:

Fig. 1 is a perspective view partly broken away of a corner connection of adjoining ducts embodying the invention.

Fig. 2 is a perspective view of the elbow used in Fig. 1.

Fig. 3 is a perspective view of a T-connection between intersecting ducts embodying the elbow of Figs. 1 and 2.

Fig. 4 is a perspective view of the construction illustrated in Fig. 3 with the top or covering members in place on the structure.

Fig. 5 is a section view along line 5—5 of Fig. 4.

Fig. 6 is an enlarged section view along line 6—6 of Fig. 4 and partly broken away, showing the interengaging edges of the elbow and conduit parts.

Referring to the drawing, the ducts to which the invention is applied are formed with sheet metal and comprise two cooperating members. The bottom or base member or strip 10 is adapted to be fastened to a wall or baseboard or other support in any usual or suitable fashion. On the top of the base member, a cover member or strip 20 may be applied by pressing the one against the other until the two snap into permanent engagement, as will hereinafter more fully appear.

The base member 10 is channel-shaped in cross section with a flat back wall 12 adapted to lie against and run along the wall or other support. From the back wall, spaced parallel side walls 14 and 16 extend forwardly and have their edges 15 and 17 bent inwardly forming an obtuse angle with side walls 14 and 16.

The top or cover member 20 is also channel-shaped in cross section with a flat front face or wall 22 from which flat parallel side walls 21 and 23 extend backwardly. The space between the side walls 21, 23 of the cover member is preferably equal to the space between the side walls 14, 16 of the base member.

In order that the cover strip 20 may be permanently engaged with and attached to the base strip readily with a snap-on action, longitudinal exterior grooves 24, 25 are pressed into the side walls of the cover strip near the longitudinal edges of the side walls by bending the strip. The edges themselves are bent inwardly from adjacent the grooves forming lips 26, 27.

The grooves 24, 25 are adapted to receive the bent-in edges 15 and 17 of the base strip; and the lips 26, 27 are adapted, when one edge of the base strip is fitted into one groove of the cover (such as the edge 15 being fitted into groove 24), for the other lip (27) to engage and cam against the other edge (17) of the base strip. Preferably the cover strip is made of thinner gauge metal than the base strip so as to possess greater resilience. Due to the greater resilience of the cover member side walls and the relative rigidity of the base strip, the cover walls flex in toward each other and allow the cover to be snapped into locking engagement with the base as the edge 17 and lip 27 slide past each other into engagement. Although the cover and base members have a firm frictional engagement, it is possible by exerting sufficient force to slide the cover longitudinally slightly relative to the base in order to adjust the relative positions of the two members and to other similar members which may abut the cover as a continuation thereof or as a branch at right angles thereto. The possible need for such adjustment will more clearly appear as the invention is further described.

In order to connect two lengths of conduit having the form described either at a corner where the conductor wires need only make a right angle bend, or at a T-connection where conductors need be continued along the head of the T as well as branched off at a right angle along the leg of the T, I provide an elbow. By inserting the elbow in the conduit lengths in different ways, it can be used to make both sorts of conduit connections as well as for a T-connection where it is desired to isolate one end of the head of the T from the leg.

The novel elbow is stamped as one piece from sheet metal into the form as best illustrated in Fig. 2. It may comprise a first and a second leg designated generally by the numerals 30 and 40 which extend at right angles to one another. Each is of channel shape and has a flat back wall 32 and 42 from which side walls 34, 36 and 44, 46, respectively extend. The side walls each run from the end of the legs toward the junction thereof to a point slightly further from the junction than the full depth of the base strip, as may be seen in Figs. 1 and 5.

The edges of the side walls of the elbow are bent outwardly at obtuse angles forming out-turned lips 35, 37, 45, 47. The elbow is of thinner guage sheet metal and possesses resilience sufficient to form a frictional engagement between the lips of the elbow and the interior surfaces of the side walls of the back member. For that purpose, the distance between the edges of the out-turned lips 35, 37 and 45, 47 respectively is slightly greater than the distance between the side walls 14 and 16 of the base member of the conduit. By slight flexing of side walls inwardly, the elbow arms may be slid into base members. The friction is not sufficient, however, to prevent sliding of the elbow along the base members manually to the proper position of adjustment.

Referring to Fig. 6, it may be observed that the lips of the elbow (e. g. 35) engage between the lips (e. g. 26)

of the cover strip and the side walls (e. g. 14) of the base strip, thus providing firm, interlocking engagement of the elbow with the conduit.

In order that the leg of the elbow, which is perpendicular to one base member, shall not have its lips interfere with the in-turned edges of that base member, the rear walls 32 and 42 of both arms of the elbow are shaped adjacent their juncture to conform to the profile of the side walls of the base member and their in-turned edges. See for example notches 38, 39 and 48, 49. Thus, when one leg of the elbow is received within a base member, the other leg will be perpendicular thereto and the portion of that perpendicular leg, which is encompassed between the side walls of said back member, will have the same profile as the profile of the interior surfaces of said base member. This may be observed by reference to Fig. 5.

In order to stiffen the elbow adjacent its corner, a pair of parallel spaced longitudinal extending ribs 50 may be pressed out of the walls 32 and 42 extending from the corner a short distance along the two legs of the elbow.

Insofar as the elbow has been thus far described, its two arms are symmetrical about the corner of the elbow. An elbow, as thus described, can be housed at a corner where two conduits of the character described join as in Fig. 1. When so used the portion of the elbow leg 40 lying between the back wall 12 of the left base member 10 and the end of the right base member 10, acts as a closure for the end of the left base member 10 which otherwise would be open. In that way the requirements of the underwriters that the wires in the conduit not be exposed anywhere along the conduit, are complied with.

In order the elbow may also be usable where it is desired to form a T or branch connection between one conduit and another which runs continuously along a wall or other supporting surface and wherein it is desired to have wires running along the continuous length continue on past the elbow, an aperture 52 may be formed in one leg of the elbow adjacent the corner. The wires may pass through this aperture if the elbow is inserted in such a way that the leg of the elbow which contains this aperture is perpendicular to the continuous conduit 100, as may be observed in Fig. 3. It would equally be possible for two sets of wires to be run through the conduit which is perpendicular to the continuous conduit and have one set branch to the left and the other to the right through the aperture 52, if so desired.

Referring to Fig. 1, an elbow having such an aperture 52 can also be used at a corner in compliance with the underwriter's requirement that no openings be left uncovered. In such case, the elbow is inserted as illustrated in Fig. 1 with that leg 40 of the elbow, which contains the aperture 52, lying within the base member against which the other conduit is to abut. Thus, the back wall 12 will underlie the opening 52 and close it when the conduits are assembled, as illustrated in Fig. 1. A similar condition could occur in a T-connection if it were desired not to have wires pass through the continuous conduit 100, provided the elbow was inserted with the aperture leg lying within the base member of the continuous conduit 100.

From the foregoing, it will be observed that when front and base members of the conduit are connected together after an elbow has been inserted into the base member endwise thereof, another conduit can be connected perpendicularly to the first conduit either at a corner or at a T-connection, as illustrated in Fig. 1 and in Figs. 3 and 4, respectively.

Commonly, the elbow will be inserted in the base strip 10 or 100 of one conduit and located at the proper place, i. e., at the end adjacent the wall corner in Fig. 1, or along the length as in Fig. 3. Then the base member of the other length of conduit will be slipped over the other perpendicularly extending leg of the elbow until the latter base member abuts the in-turned edges 15, 17 of the first base member.

In that condition, no impediment exists to laying in of the conductor wires in the base members. After they are laid in, whether or not connected with an electric outlet or other electric wiring device (not shown) on the cover member, the cover members can be engaged and snapped in place on the base members in the manner described.

From the foregoing, it will be observed that I have provided a novel elbow for connecting two piece sheet metal conduits which elbow may be stamped as one piece from sheet metal readily into symmetrical shape and may be provided in the course of the stamping operation with an aperture to provide for the use of the elbow in three alternative conditions. It will also be observed from the foregoing that the novel elbow construction may be very easily assembled in conduits to form any of the aforementioned connections. It is advantageous to have the elbow inside the conduit and covered thereby, when assembled, because thereby the need for painting and finishing of the elbow in any way to match the conduit is avoided.

Many modifications within the scope of my invention will occur to those skilled in the art. Therefore, I do not limit it to the specific embodiment illustrated and described.

What is claimed is:

1. An elbow connection for electric conduits comprising a stamped sheet metal one piece member having legs with back walls the planes of which extend at an angle to each other, said back walls each being adapted to lie within a base member of a conduit against the back wall of said base member, and side walls extending forwardly from the back walls of said legs and having their longitudinal edges out-turned at an obtuse angle and adapted to engage the side walls of the conduit resiliently, the portion of said legs that lies within the conduit base member and in angular relation thereto being formed with a profile similar to the base member interior walls to enable the elbow to be slid along said base member.

2. An elbow connection as claimed in claim 1 having an aperture in one leg for passage of electric wire conductors when said elbow is used to make a T connection between conduits, said elbow being insertable in a conduit with said apertured leg lying against a back conduit wall to close said aperture, when said elbow is used to make a plain corner connection between conduits.

3. An elbow for connecting identical sections of electric conduits, the conduit sections each comprising a channel-shaped base strip having a back wall adapted to be attached to a building wall and two parallel forwardly extending side walls each having an in-turned longitudinal edge, and a channel-shaped cover strip having a front wall and two parallel rearwardly extending side walls each having an exterior longitudinal groove into which said in-turned edges of the base strip fit to hold the cover on the base strip, said elbow comprising a one piece member having legs with back walls the planes of which extend at an angle to each other, said back walls each being adapted to lie within a base strip and against its back wall, side walls extending forwardly from the back walls of said legs, with their forward edges positioned to be engaged between the edges of said cover and base strips, the portion of said legs that lies within the conduit base strips and in angular relation thereto being formed with a profile similar to the base strip interior walls.

4. An elbow connection as claimed in claim 3 wherein the side walls of the elbow have their longitudinal edges out-turned for resiliently engaging the base strip side walls.

5. An elbow connection as claimed in claim 4 having an aperture in one leg for passage of electric wire conductors, when said elbow is used to make a T-connection between conduits, said elbow being insertable in a conduit with said apertured leg lying against a back conduit wall to close said aperture, when said elbow is used to make a plain corner connection between conduits.

6. An elbow connection as claimed in claim 3 having an aperture in one leg for passage of electric wire conductors, when said elbow is used to make a T-connection between conduits, said elbow being insertable in a conduit with said apertured leg lying against a back conduit wall to close said aperture, when said elbow is used to make a plain corner connection between conduits.

7. The combination with identical electric conductor conduits having interlocking cover and base strips, of an elbow connecting said strips at an internal angle, said elbow having legs within each of the base strips of the intersecting conduits, said cover and base strips having interlocking longitudinal edges engaging with the edges of said legs to provide firm engagement between said legs and conduits.

8. The combination with identical electric conductor conduits having interlocking cover and base strips, of an elbow connecting said strips at an angle, said elbow having legs within each of the base strips of the intersecting conduits, said legs having portions adapted to lie flush against the rear walls of said base strips, one of said legs having an aperture for passage of conductor wires when said elbow forms a T-connection.

9. The combination with identical electric conductor conduits having interlocking cover and base strips, of an elbow connecting said strips at an angle, said elbow having legs within each of the base strips of the intersecting conduits, said legs having portions adapted to lie flush against the rear walls of said base strips, one of said legs having an aperture for passage of conductor wires when said elbow forms a T-connection, said elbow being reversible in position to cause said aperture to be closed by a base strip rear wall when desired.

10. The combination with identical electric conductor conduits having interlocking cover and base strips, of an elbow connecting said strips at an angle, said elbow having legs within each of the base strips of the intersecting conduits, said legs having channel-shaped portions, the transverse parts thereof lying against the rear walls of said base strips, said cover and base strips having interlocking longitudinal edges engaging with the edges of said legs to provide firm engagement between said legs and conduits.

11. The combination as claimed in claim 7 wherein the portion of said legs lying within a base strip and in angular relation thereto has a profile similar to the base strip within which it lies, to enable the elbow to be moved along the strip.

12. The combination as claimed in claim 10 wherein one leg has an aperture for passage of conductor wires when a T-connection is formed.

13. The combination as claimed in claim 11 wherein the back wall of one leg of the elbow closes the end of the base section in which the other leg lies.

References Cited in the file of this patent

UNITED STATES PATENTS

| | | |
|---|---|---|
| 1,729,315 | Widell | Sept. 24, 1929 |
| 2,250,276 | Rutherford et al. | July 22, 1941 |
| 2,515,255 | O'Brien et al. | July 18, 1950 |

FOREIGN PATENTS

| | | |
|---|---|---|
| 476,871 | Great Britain | Dec. 13, 1937 |